July 2, 1929.  J. E. KOONTZ  1,719,663
GASKET CUTTER
Filed April 4, 1927
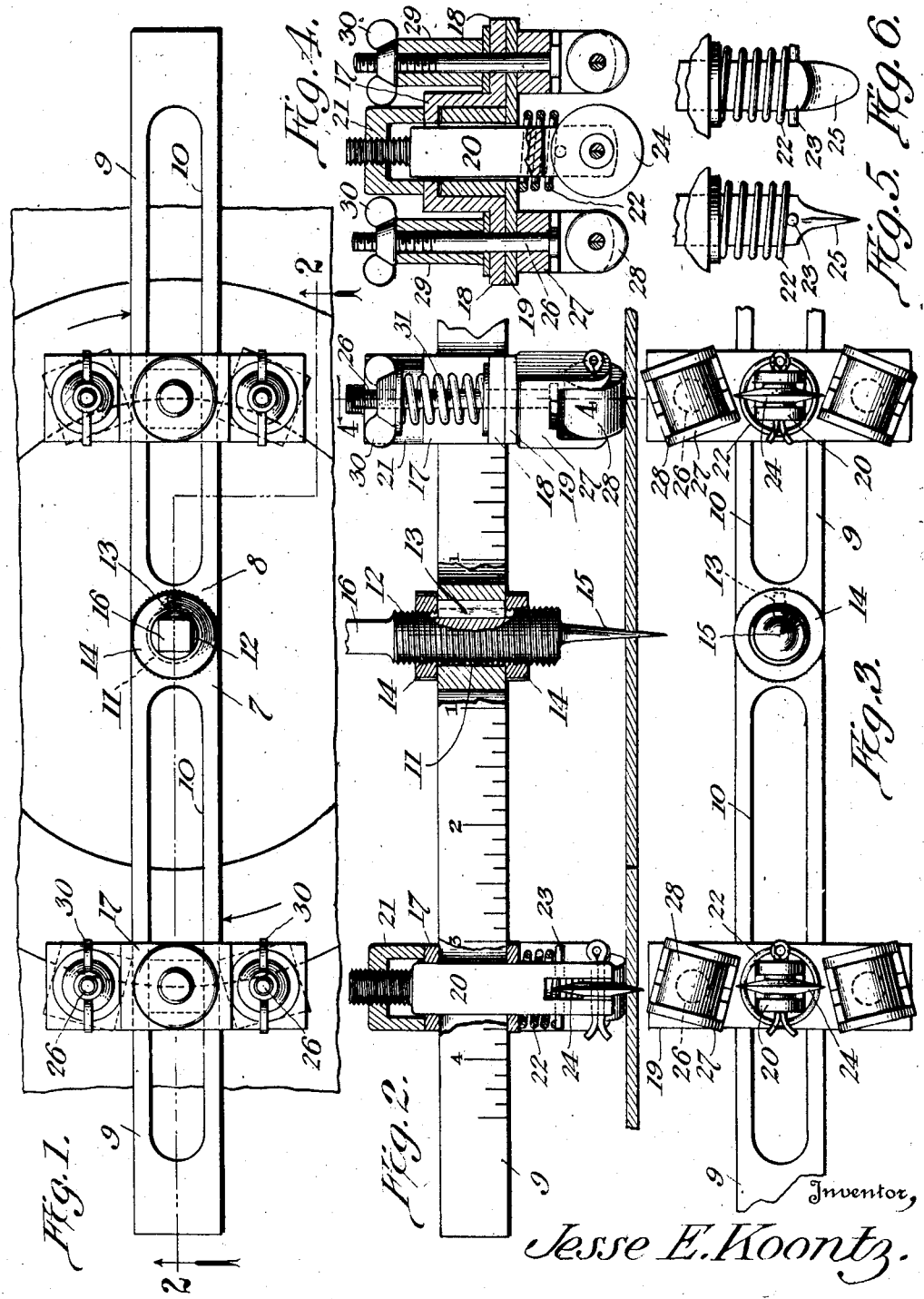
Inventor,
Jesse E. Koontz
By
Attorney Patented July 2, 1929.

1,719,663

UNITED STATES PATENT OFFICE.

JESSE E. KOONTZ, OF CHARLESTON, SOUTH CAROLINA.

GASKET CUTTER.

Application filed April 4, 1927. Serial No. 180,837.

The present invention relates to gasket cutters, the object being to provide a novel and effective apparatus, by which gaskets or rings of various diameters and widths may be cut from sheet material with ease, expedition and accuracy.

In the accompanying drawings:—

Figure 1 is a plan view of the implement,

Figure 2 is a vertical sectional view through the same on the line 2—2 of Figure 1, Figure 3 is a bottom plan view, Figure 4 is a cross sectional view on the line 4—4 of Figure 2, Figure 5 is a detail view of a modified form of cutter, Figure 6 is a view of the modified form but at right angles to that shown in Figure 5.

In the embodiment disclosed, a bar 7 is employed having a central portion 8, forming oppositely extending arms 9. These arms are longitudinally slotted, as shown at 10. The central portion is provided with a central bore 11, in which is slidably mounted a threaded stem 12 preferably held against rotation in the bore by a key 13. Holding nuts 14 on the threaded portion engage the upper and lower sides of the bar to hold the stem against its longitudinal movement and in different positions. The lower end of the stem is provided with a central tapered pointed spindle 15, while the upper end has a shank 16 which may be of any suitable shape, but is preferably square so as to engage in the socket of a hand brace or like implement. By this means the bar can be rotated on an axis determined by the pointed spindle 15.

On each arm 9 of the bar is slidably mounted a carrier, preferably comprising an upper substantially U-shaped bar 17 with outstanding terminal ears 18 and a lower bar 19 that bears against the undersides of the ears 18, the two bars embracing the arm, as clearly shown in Figure 4. Passing through the slot 10 of the arm and through the bars 18 and 19 is an angular shank 20, on the upper end of which is threaded a holding nut 21 that bears on the upper bar. A coiled spring 22 operates against a suitable abutment 23 on the lower portion of the shank and serves to yieldingly urge the shank downwardly. On the lower end of this shank is mounted a cutter which may be either a rotary cutter 24, or a knife blade 25, as shown in Figures 5 and 6.

Extending through the outstanding flanges 18 and the terminal portions of the bar 19 are bolts 26, carrying at their lower ends brackets 27, in which are journaled rollers 28. These bolts are rotatable in their mountings, and consequently the rollers can be set at different inclinations. The rollers, it will be observed by reference to Figure 3, are located in advance of and behind the cutters and traverse the paths of said cutters. The rollers can be secured in any suitable manner. Thus in one of the carriers the bolts 26 have their upper ends passing through sleeves 29, with nuts 30 threaded on the bolts and bearing against the sleeves. By loosening these nuts, obviously the rollers can be turned to different angular relations. Instead of sleeves, as 29, springs 31 may be employed, the springs having sufficient force to hold the rollers in their adjusted positions and yet permitting them to be turned frictionally to different relations.

With this construction, it will be evident that if a sheet of material is placed beneath the tool, with the journal pin 15 inserted thereinto, and a brace is attached to the cutters will be yieldingly held upon the material cut through the same. The two cutters can be adjusted to different distances from the axis of rotation, and consequently, as indicated in Figure 1, one will cut the inside of the ring and the other will cut the outside of the ring. Obviously therefore gaskets or other articles of different diameters and of different widths can be readily cut from material of any character, such as cloth, rubber, lead and copper. The rollers have been found peculiarly effective in that they hold the sheet down smoothly and firmly in advance of and behind the cutters, thus preventing puckering of the material.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In a sweep cutter, the combination with a rotatable carrier arm, and a spindle constituting a pivot therefor, of a material engaging knife cutter mounted on the arm, and means having a common path of movement with that of the cutter for holding the portion of the material being engaged by the cutter against puckering.

2. In a sweep cutter, the combination with a rotatable carrier arm and a spindle constituting a pivot therefor, of a cutter mounted on the arm and adjustable toward and from the axis of rotation of said arm, means that traverses the path of the cutter for holding the material being cut against puckering, and means for adjusting said means to the curvature of the cutter's path.

3. A sweep cutter comprising a rotatable arm, a carrier adjustable on the arm toward and from its axis of rotation, a cutter on the carrier, and a roller journaled on the carrier and adjustable therewith.

4. A sweep cutter comprising a rotatable arm, a carrier adjustable on the arm toward and from its axis of rotation, a cutter on the carrier, and a roller journaled on the carrier and adjustable therein to different angles to vary the curvature of its path to the width circumscribed by the cutter.

5. A sweep cutter comprising a rotatable arm, a carrier adjustable on the arm toward and from its axis of rotation, a cutter on the carrier, and pucker-preventing rollers mounted on the carrier and operating in advance of and behind the cutter, said cutter and rollers being adjustable with the carrier.

6. A sweep cutter comprising a rotatable arm, a carrier adjustable on the arm toward and from its axis of rotation, a cutter on the carrier, and pucker-preventing rollers mounted on the carrier and operating in advance of and behind the cutter, said cutter and rollers being adjustable with the carrier and said rollers having a rotatable mounting on the carrier to permit them to be turned to different angular relations.

7. In a sweep cutter, the combination with a bar, of a pivot pin mounted on the central portion of the bar, carriers slidably mounted on the bar on opposite sides of the pivot pin and adjustable toward and from the same, a cutter yieldingly mounted on each carrier, brackets rotatably mounted on the carriers in front of and behind the cutters, and pucker preventing rollers journaled in the brackets and operating in advance of and behind the cutters.

8. A sweep cutter comprising a rotatable arm, a pivot engaged with the arm and about which it rotates as an axis, a material-engaging knife cutter mounted on the arm at one side of the pivot, and a roller adjacent the cutter and traversing the path of the cutter.

9. A sweep cutter comprising a rotatable arm, a pivot engaged with the arm and about which it rotates as an axis, a material-engaging knife cutter mounted on the arm at one side of the pivot, and rollers operating in advance of and behind the cutter adjacent thereto.

In testimony whereof, I affix my signature.

JESSE E. KOONTZ.